(12) United States Patent
Homeier et al.

(10) Patent No.: US 10,909,149 B2
(45) Date of Patent: Feb. 2, 2021

(54) METHOD AND DEVICE FOR CREATING AND PROVIDING A MAP

(71) Applicant: Robert Bosch GmbH, Stuttgart (DE)

(72) Inventors: Roland Homeier, Wennigsen (DE); Christian Passmann, Diekholzen (DE); Daniel Zaum, Sarstedt (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 16/190,929

(22) Filed: Nov. 14, 2018

(65) Prior Publication Data
US 2019/0147072 A1    May 16, 2019

(30) Foreign Application Priority Data
Nov. 14, 2017   (DE) ................ 10 2017 220 242

(51) Int. Cl.
| G06F 16/29 | (2019.01) |
| G01C 21/32 | (2006.01) |
| G01C 21/36 | (2006.01) |
| G01S 13/89 | (2006.01) |
| G01S 17/89 | (2020.01) |

(52) U.S. Cl.
CPC .......... G06F 16/29 (2019.01); G01C 21/32 (2013.01); G01C 21/367 (2013.01); G01S 13/89 (2013.01); G01S 17/89 (2013.01)

(58) Field of Classification Search
None
See application file for complete search history.

(56) References Cited

U.S. PATENT DOCUMENTS

| 8,351,704 B2 | 1/2013 | Kmiecik et al. |
| 2007/0198184 A1* | 8/2007 | Yoshioka ............... G01C 21/36 701/426 |
| 2012/0197839 A1* | 8/2012 | Vervaet ................. G01C 21/32 707/609 |
| 2013/0030692 A1 | 1/2013 | Hagan |
| 2013/0212079 A1* | 8/2013 | Verheyden ............. G01C 21/32 707/705 |

FOREIGN PATENT DOCUMENTS

| DE | 10009149 A1 | 3/2001 |
| DE | 102006037334 A1 | 12/2007 |

OTHER PUBLICATIONS

Hiestermann, "Map-independent location matching certified by the AGORA-C standard", Transportation Research Part C 16, 2008, p. 307-319 (Year: 2008).*
"Open format for local map data", 2009 (Year: 2009).*

* cited by examiner

*Primary Examiner* — Tamara L Weber
(74) *Attorney, Agent, or Firm* — Norton Rose Fulbright US LLP; Gerard Messina

(57) ABSTRACT

In a method and a device for creating and providing a map, a highly accurate map that includes multiple highly accurate map features is obtained, a shared map feature attribute is determined as a function of the multiple highly accurate map features, a derivative map is created as a function of the shared map feature attribute, and the map is output.

10 Claims, 3 Drawing Sheets

METHOD AND DEVICE FOR CREATING AND PROVIDING A MAP

CROSS-REFERENCE TO RELATED APPLICATIONS

The present application claims priority under 35 U.S.C. § 119 to DE 10 2017 220 242.4, filed in the Federal Republic of Germany on Nov. 14, 2017, the content of which is hereby incorporated by reference herein in its entirety.

FIELD OF THE INVENTION

The present invention relates to a method and a device for creating and providing a map, where a highly accurate map is obtained, a shared map feature attribute is determined, a map is created as a function of the shared map feature attribute, and the created map is provided.

SUMMARY

According to an example embodiment of the present invention, a method for creating and providing a map includes reading in a highly accurate map that includes multiple highly accurate map features, determining a shared map feature attribute as a function of the multiple highly accurate map features, creating another map as a function of the shared map feature attribute, and providing the map.

A map, highly accurate map, and/or existing map are/is generally understood to mean a digital map that is present in the form of (map) data values on a memory medium. The map and/or the highly accurate map are/is designed, for example, to encompass one or multiple map layers, one map layer showing, for example, a map from a bird's-eye view (course and position of streets, buildings, landscape features, etc.) corresponding to a map of a navigation system, for example; a further map layer including, for example, a radar map, for example that include map features (streets, intersections, buildings, infrastructure features, etc.) stored with a radar signature; a further map layer including, for example, a LIDAR map whose features are stored with a LIDAR signature; and/or a further map layer including, for example, surroundings features (buildings, landscape features, infrastructure features, etc.) in the form of surroundings feature data values, the surroundings feature data values including, for example, a position of the surroundings features and/or other variables such as length information concerning the surroundings features and/or a description of whether the surroundings features are permanently or temporarily present. In an example embodiment, the map and/or the highly accurate map each correspond(s) to a map layer.

The highly accurate map differs from the map in that the map features and/or surroundings features of the highly accurate map, and which thus correspond to the highly accurate map features, are included with a highly accurate position, i.e., a position that is at least accurate enough that, for example, an automated vehicle can be operated as a function of this highly accurate position. A highly accurate position is accurate enough, for example, that locating an (automated) vehicle, as a function of a lane and/or relative to the lane boundaries, is possible. A highly accurate position is typically determined with an inaccuracy of 10 cm maximum. In another example embodiment, additionally or alternatively the highly accurate map differs from the map in that the highly accurate map includes considerably more map features and/or surroundings features, in particular as a function of a comparable map detail. For example, a street in the highly accurate map is described with the aid of a linkage of many highly accurate positions that represent an exact location of the street, for example in GPS coordinates. The exact course of the street and the width of the street as well as additional information such as the number and the course of the individual lanes are included. In contrast, the map includes, for example, the same street with the aid of fewer positions, without the additional information about the street width and/or number of lanes.

Example embodiments of the present invention advantageously achieves provision of a highly accurate map that is used in particular for operating an automated vehicle, as well as map provision to non-automated vehicles or driver information systems (FISs) and/or driver assistance systems (FASs) that use the maps in the sense of the map that is not highly accurate (i.e., a map that is not highly accurate). For this purpose, as a function of the (extensive) map data represented by the highly accurate map, so-called map feature attributes are determined that are based, for example, on multiple highly accurate map features, and thus, for example, stored in the map with a smaller data volume. This allows use of the map instead of the highly accurate map, and FISs and/or FASs can be operated with a smaller computing capacity than is the case with automated vehicles, for example.

The map is preferably provided in such a way that a vehicle is operated as a function of the map. A vehicle is understood to mean a vehicle that is operated manually (by a driver) as well as an automated vehicle, an automated vehicle being understood to mean a semi or highly or completely automated vehicle. An operation of the vehicle is understood to mean, for example, a route computation, a traffic jam notification, a construction site warning notification, and/or an operation of adaptive headlights, a range display, and/or an at least partial transverse and/or longitudinal control, etc.

This yields the advantage that the pieces of information of the highly accurate map that are provided in the form of the map can be used to operate a vehicle, thus in particular enhancing the safety when operating this vehicle.

The map is preferably created based on an existing map as a function of the shared map feature attribute.

An existing map is understood in particular to mean a map that is not highly accurate. This yields an advantage that the map can be created easily, rapidly, and cost-effectively.

A step of linking the highly accurate map and the existing map preferably takes place as a function of at least one of the highly accurate map features. This advantageously allows simple, rapid creation of the map.

The shared map feature attribute is preferably determined as a function of geometric and/or topological characteristics of the multiple map features. A geometric characteristic is understood to mean, for example, a description of a shape and/or a size and/or a position (in a two- or three-dimensional space) of an object (in the present case, a map feature). A topological characteristic is understood to mean, for example, a topological relationship between objects (in the present case, map features), such as nodes, edges, or meshes. A topological characteristic of two intersecting streets describes, for example, whether the streets actually intersect or whether they merely overlap so that a turn from one street into the other street is precluded (one street in the form of a bridge or in the form of a tunnel leads above or beneath the other street). This yields an advantage that even complex structures of the multiple map features, due to their geometric and/or topological characteristics, can be easily and effectively provided in the form of map feature attributes in such a way that that FISs and/or FASs can be operated independently of same.

According to an example embodiment of the present invention, a device for creating and providing a map includes first means for reading in a highly accurate map that includes multiple highly accurate map features, and second means for determining a shared map feature attribute as a function of the multiple highly accurate map features. In addition, the device includes third means for creating the map as a function of the shared map feature attribute, and fourth means for providing the map.

The first means and/or the second means and/or the third means and/or the fourth means are/is preferably designed for carrying out the above-described method(s).

Exemplary embodiments of the present invention are illustrated in the drawings and explained in greater detail in the following description.

DETAILED DESCRIPTION

Figure 1:
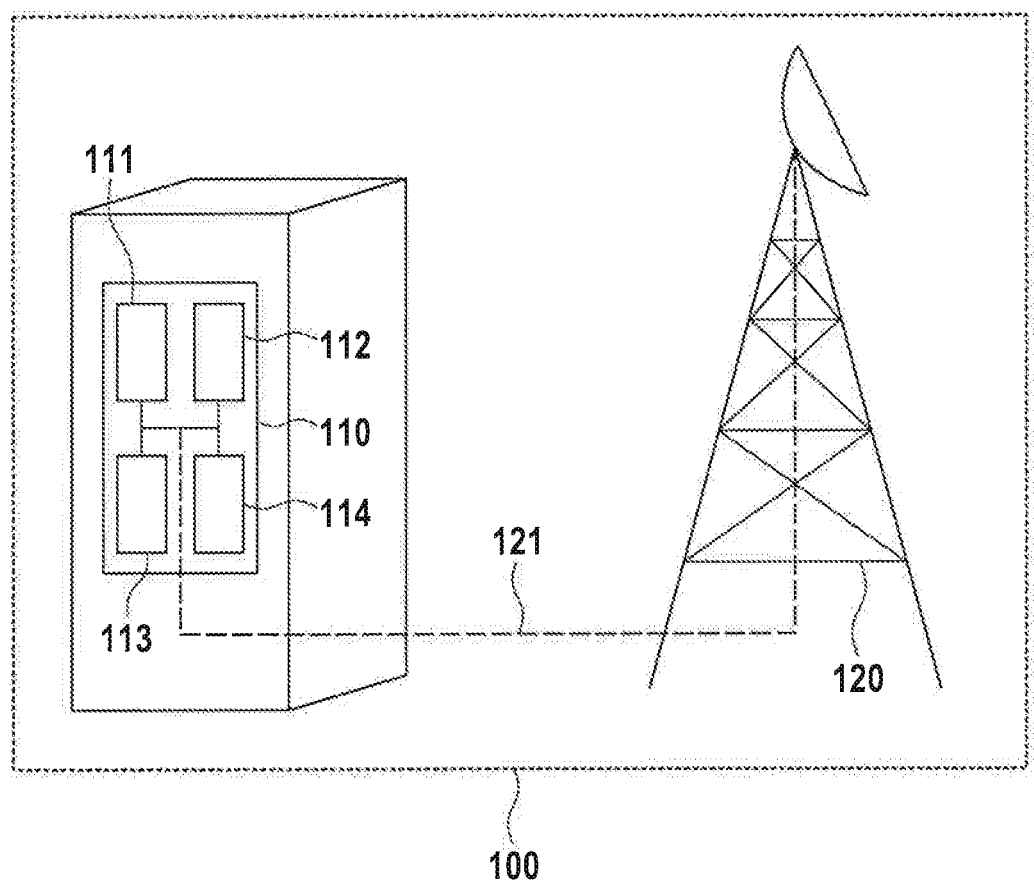
FIG. 1 illustrates a device according to an example embodiment of the present invention.

FIG. 1 shows a processing unit 100 that includes a device 110 for creating 330 and providing 340 a map 410. A processing unit 100 is understood to mean a server, for example. In another example embodiment, a processing unit 100 is understood to mean a cloud, i.e., a combination of at least two electronic data processing systems that exchange data using the Internet, for example. In another example embodiment, processing unit 100 corresponds to device 110.

Device 110 includes first means 111 for reading in 310 a highly accurate map 420 that includes multiple highly accurate map features, and second means 112 for determining 320 a shared map feature attribute as a function of the multiple highly accurate map features. The device 110 also includes third means 113 for creating 330 map 410 as a function of the shared map feature attribute, and fourth means 114 for providing 340 map 410.

First means 111 and/or second means 112 and/or third means 113 and/or fourth means 114 can likewise be provided in different example embodiments, as a function of the particular example embodiment of processing unit 100. If processing unit 100 is designed as a server, first means 111 and/or second means 112 and/or third means 113 and/or fourth means 114 are/is localized at the same location, as a function of the location of device 110.

If processing unit 100 is designed as a cloud, first means 111 and/or second means 112 and/or third means 113 and/or fourth means 114 can be localized in different locations, for example in different cities and/or in different countries, a connection such as the Internet being provided for exchanging (electronic) data between first means 111 and/or second means 112 and/or third means 113 and/or fourth means 114.

First means 111 are designed for reading in a highly accurate map 420 that includes multiple highly accurate map features. In an example embodiment, for example, highly accurate map 420 is read in by receiving it from an external map provider or an external database. For this purpose, first means 111 are designed as a receiving unit and/or transmitting unit with the aid of which data are requested and/or received. In another example embodiment, first means 111 are designed in such a way that they are connected, starting from device 110, to an externally situated transmitting and/or receiving unit 120 with the aid of a wired and/or wireless connection 121. In addition, first means 111 include electronic data processing elements such as a processor, a working memory, and a hard disk, that are designed for storing and/or processing highly accurate map 420, for example changing and/or adapting the data format and subsequently relaying to second means 112. In another example embodiment, first means 111 are designed in such a way that highly accurate map 420 is already stored on the hard disk, and highly accurate map 420 is read in by reading the map data values of highly accurate map 420 into the working memory of first means 111 and/or second means 112.

In addition, second means 112 are designed for determining a shared map feature attribute as a function of the multiple highly accurate map features. For this purpose, second means 112 are designed as a processing unit, for example, that includes electronic data processing elements such as a processor, a working memory, and a hard disk. In addition, second means 112 include appropriate software that is designed for determining a shared map feature attribute as a function of the multiple highly accurate map features.

In addition, device 110 includes third means 113 which, for example as a processing unit with electronic data processing elements (processor, working memory, hard disk, etc.), are designed to create map 410 as a function of the shared map feature attribute.

In an example embodiment, map 410 is created, for example, as a function of the shared map feature attribute and based on an existing map. For this purpose, the shared map feature attribute is, for example, entered into the existing map and/or the existing map is adapted and/or corrected as a function of the shared map feature attribute, so that the existing map subsequently corresponds to map 410. In another example embodiment, the existing map corresponds, for example, to highly accurate map 420, and map 410 is created by determining the shared map feature attribute as a function of highly accurate map 420, and subsequently removing the highly accurate map features, in the form of data values, from highly accurate map 420 and replacing them with the shared map feature attribute, which ultimately thus corresponds to map 410. In this way, for example, the data volume and/or the complexity and/or the level of detail of highly accurate map 420 are/is reduced, and the highly accurate map is converted into created map 410. In an example embodiment, the existing map is for example likewise read in using first means 111, the existing map being stored on the hard disk, requested, and/or received from an external map provider or an external database, depending on the example embodiment.

In addition, device 110 includes fourth means 114 for providing 340 map 410. For this purpose, fourth means 114 include a transmitting unit and/or receiving unit with the aid of which data are requested and/or received. In another example embodiment, fourth means 114 are designed in such a way that they are connected, starting from device 110, to an externally situated transmitting and/or receiving unit 120 with the aid of a wired and/or wireless connection 121. In another example embodiment, the transmitting means and/or receiving means are/is identical to the transmitting means and/or receiving means of first means 111 (if the latter, depending on the example embodiment, are designed as a transmitting unit and/or receiving unit).

In addition, fourth means 114 include electronic data processing elements such as a processor, a working memory, and a hard disk, that are designed for processing the determined data, for example to change and/or adapt the data format and subsequently provide map 410 as data values.

Figure 2:
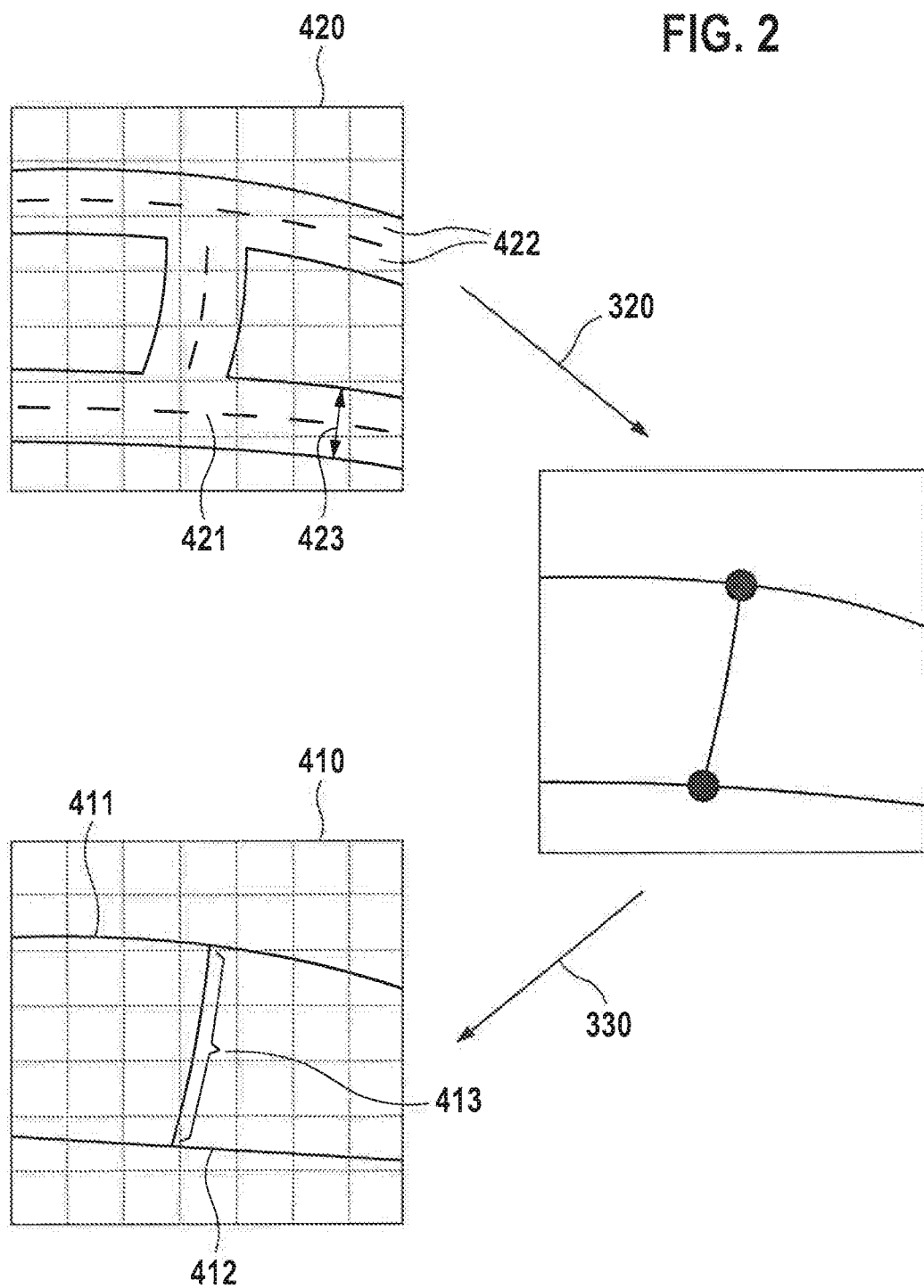
FIG. 2 illustrates an example of a highly accurate map and a map that is created according to an example embodiment of the present invention.

FIG. 2 illustrates an example of how the shared map feature attribute is determined and map 410 is created with the aid of method 300 according to an example embodiment of the present invention. Map 410 and highly accurate map 420 are graphically illustrated for this example embodiment.

Highly accurate map 420 shows a highly accurate course of the street in the form of a first highly accurate map feature 421, a number of lanes as second highly accurate map feature 422, and a width of the street as third highly accurate map feature 423.

Based on the highly accurate map features, a shared map feature attribute is now determined, it also being possible to determine multiple shared map feature attributes, in each case as a function of multiple (different) highly accurate map features.

Map 410 is subsequently created as a function of the shared map feature attribute. Compared to highly accurate map 420, map 410 no longer includes the highly accurate map features, and instead contains simplified information. For example, a curved street 411 is described as a function of its radius of curvature (for example, between a start point and a destination point). A further simplification is represented, for example, by approximating a minimally curved street by a straight line 412 (in particular since the slight curvature would be unimportant for operating certain FISs and/or FASs). A further simplification is represented, for example, by an indication of length 413 (between the two intersections) instead of an exact course of a connecting section between two streets, (in particular since this is sufficient, for example, to warn a driver of a vehicle of an upcoming intersection).

Figure 3:
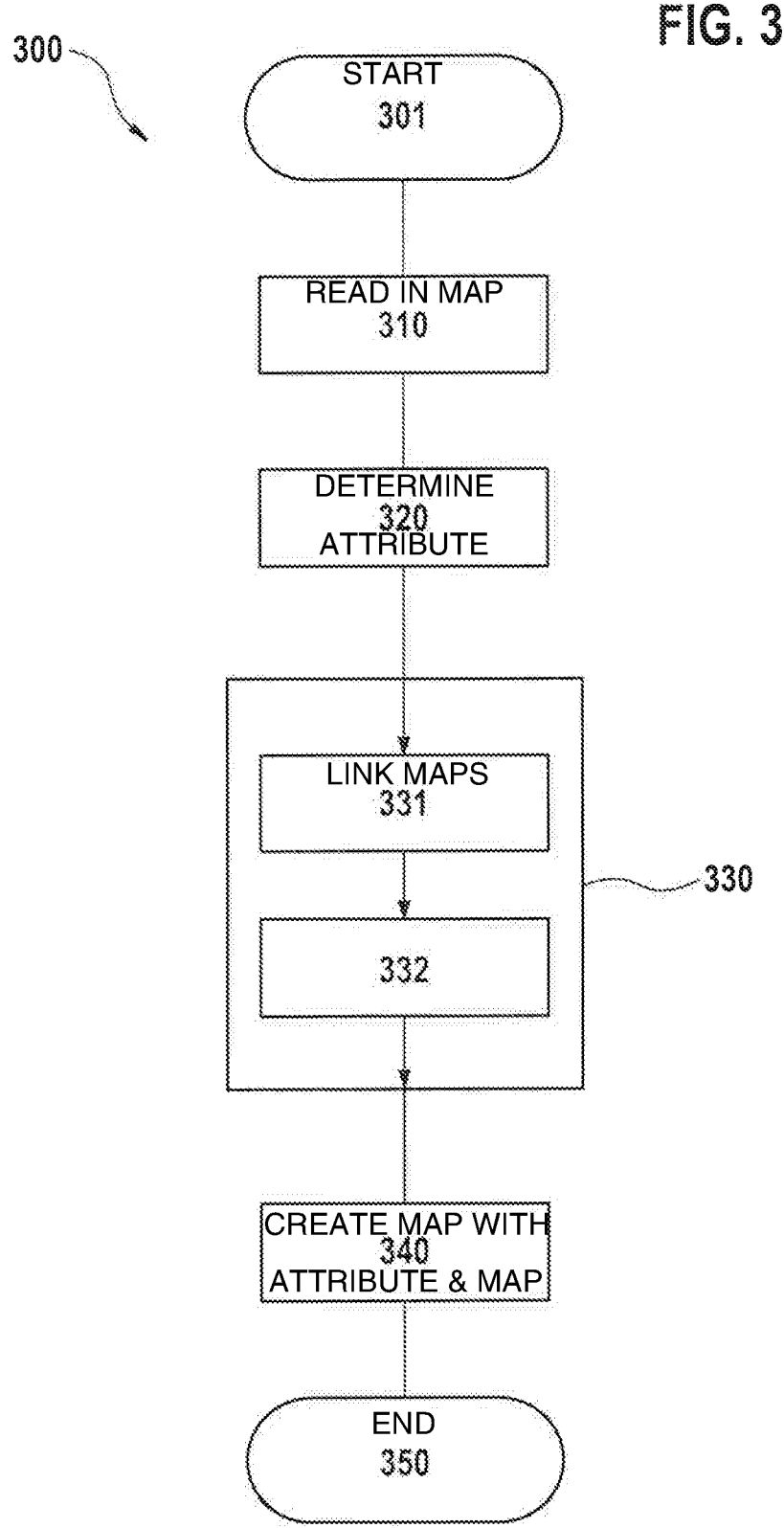
FIG. 3 is a flowchart that illustrates a method according to an example embodiment of the present invention.

FIG. 3 shows a method 300 for creating 330 and providing 340 a map 410 according to an example embodiment of the present invention. Method 300 starts in step 301. In step 310, a highly accurate map 420 that includes multiple highly accurate map features is read in A shared map feature attribute is determined, as a function of the multiple highly accurate map features, in step 320. For this purpose, for example data or highly accurate map features from highly accurate map 420 are combined into a shared map feature attribute in such a way that it can be used for creating 330 map 410. Based on highly accurate geometric data, for example (such as the course of the lane marker), a map feature attribute is determined that is valid for a fairly long route section, for example. Possible map feature attributes, for example, include but are not limited to: an average curvature of a lane marker (for example over an area of approximately 100 m), a curvature of a roadway section, a height profile or a downhill or uphill grade of a roadway section, a number of construction sites on a roadway section, a number of obstacles on a roadway section, a number of instances of road damage on a roadway section, a predefined piece of speed information, an average speed, a right-of way rule, a number of lanes, a width of the lanes, an average traffic density per lane, a recommendation for a lane selection, a connectivity of the lanes (in intersection situations, for example), and/or a description of the lateral delimitation of the roadway section, etc.

Map 410 is created, as a function of the shared map feature attribute, in step 330.

In an example embodiment, map 410 is created based on an existing map, for example. Method 300 is used, for example, to correct and/or qualitatively enhance map features or attributes of the existing map as a function of the information from highly accurate map 420, and/or to supplement and/or add map features or attributes, not previously present, with/to the existing map as a function of the information from highly accurate map 420. Furthermore, method 300 is additionally or alternatively used, for example, to reduce and/or remove map features or attributes from the existing map, as a function of the information from highly accurate map 420. In addition, method 300 is additionally or alternatively used, for example, to make changes to the geometric and/or topological information and/or characteristics of existing map, as a function of the information from highly accurate map 420.

For example, highly accurate map 420 is linked to the existing map, as a function of at least one of the highly accurate map features, in a step 331. Since the aim of method 300 in this example embodiment is to link data or map features from highly accurate map 420 to the existing map, the two maps having very different demands for accuracy, mutually corresponding geometric regions in the two maps are to be associated or linked. This takes place on the one hand via a comparison of the global coordinate reference system, and on the other hand via a correlation of features (intersections, length indications, etc.) that are encompassed by the existing map and by highly accurate map 420. The methods used are similar, and are based, for example, on so-called location referencing techniques such as AGORA-C or OpenLR.

Map 410 is subsequently created, for example, in a step 332, as a function of the shared map feature attribute and based on existing map, which has been previously linked to highly accurate map 420 in step 331. Map 410 is provided in step 340, and method 300 ends in step 350.

What is claimed is:

1. A method for providing a derivative map, the method comprising:
reading in, via a first device, a highly accurate map that includes multiple highly accurate map features from an external map provider or an external database, wherein the first device includes a transmitting and receiving unit;
determining, via a second device, a shared map feature attribute based on the multiple highly accurate map features, wherein the second device includes a processor, a working memory and a non-volatile memory for storing and/or determining the shared map feature;
creating, via a third device, a derivative map based on the determined shared map feature attribute, wherein the third device includes a processor, a working memory and a non-volatile memory for storing and/or creating the derivative map; and
outputting, via a fourth device, the derivative map, wherein the fourth device includes a transmitting and receiving unit;
wherein the derivative map does not include the highly accurate map features, and
wherein the highly accurate map includes highly accurate positions that are accurate enough to locate a vehicle as a function of a lane and/or relative to lane boundaries of the lane.

2. The method of claim 1, wherein the output of the derivative map affects an operation of a vehicle.

3. The method of claim 1, wherein the creating of the derivative map is additionally based on an existing map.

4. The method of claim 3, further comprising:
linking the highly accurate map and the existing map based on at least one of the highly accurate map features.

5. The method of claim 1, wherein the shared map feature attribute is determined based on one or both of geometric characteristics of the multiple highly accurate map features and topological characteristics of the multiple highly accurate map features.

6. A device, comprising:
a first device;
an output; and
a processor of a server is configured to perform the following:
reading in, via the first device, a highly accurate map that includes multiple highly accurate map features from an external map provider or an external database, wherein the first device includes a transmitting and receiving unit;
determining, via a second device, a shared map feature attribute based on the multiple highly accurate map features, wherein the second device includes a processor, a working memory and a non-volatile memory for storing and/or determining the shared map feature;
creating, via a third device, a derivative map based on the determined shared map feature attribute, wherein the third device includes a processor, a working memory and a non-volatile memory for storing and/or creating the derivative map; and
outputting, via a fourth device, the derivative map via the output, wherein the fourth device includes a transmitting and receiving unit;
wherein the derivative map does not include the highly accurate map features, and
wherein the highly accurate map includes highly accurate positions that are accurate enough to locate a vehicle as a function of a lane and/or relative to lane boundaries of the lane.

7. The device of claim 6, wherein the output of the derivative map affects an operation of a vehicle.

8. The device of claim 6, wherein the creation of the derivative map is additionally based on an existing map.

9. The device of claim 8, wherein the processor of the server is configured to link the highly accurate map and the existing map based on at least one of the highly accurate map features.

10. The device of claim 6, wherein the shared map feature attribute is determined based on one or both of geometric characteristics of the multiple highly accurate map features and topological characteristics of the multiple highly accurate map features.

* * * * *